US009921401B2

(12) United States Patent
Kohno et al.

(10) Patent No.: US 9,921,401 B2
(45) Date of Patent: Mar. 20, 2018

(54) MEASURING DEVICE WITH ALIGNMENT AND REFERENCE POSITION FOR MEASUREMENT OBJECT

(71) Applicant: SINTO S-PRECISION, LTD., Atsugi-shi (JP)

(72) Inventors: Katsumi Kohno, Hadano (JP); Tatsuya Aoki, Hadano (JP)

(73) Assignee: Sinto S-Precision, Ltd., Atsugi-Shi, Kanagawa (JP)

( * ) Notice: Subject to any disclaimer, the term of this patent is extended or adjusted under 35 U.S.C. 154(b) by 0 days.

(21) Appl. No.: 15/234,384

(22) Filed: Aug. 11, 2016

(65) Prior Publication Data
US 2017/0061645 A1    Mar. 2, 2017

(30) Foreign Application Priority Data
Aug. 24, 2015   (JP) ................................ 2015-164374

(51) Int. Cl.
    *H04N 7/18*      (2006.01)
    *G02B 21/36*     (2006.01)
    *G02B 21/00*     (2006.01)

(52) U.S. Cl.
    CPC ....... *G02B 21/361* (2013.01); *G02B 21/0016* (2013.01); *G02B 21/365* (2013.01)

(58) Field of Classification Search
    CPC .................................................. G02B 21/361
    (Continued)

(56) References Cited

U.S. PATENT DOCUMENTS

| 4,848,907 A | 7/1989 | Yokokura et al. |
| 2014/0071243 A1* | 3/2014 | Nakatsukasa .......... G01B 11/24 348/46 |

(Continued)

FOREIGN PATENT DOCUMENTS

| JP | S61-6707 U | 1/1986 |
| JP | S63-061925 A | 3/1988 |

(Continued)

OTHER PUBLICATIONS

Decision to Grant dated May 10, 2016, in connection with Japanese Patent Application No. 2015-164374, 6 pgs.

(Continued)

*Primary Examiner* — Richard Torrente
(74) *Attorney, Agent, or Firm* — Chiesa Shahinian & Giantomasi PC

(57) ABSTRACT

A measuring device includes: a placement unit that places thereon a measurement object; an alignment microscope that observes an area including a measurement reference position of the measurement object placed on the placement unit; an capturing unit that captures an image of the area including the measurement reference position observed by the alignment microscope; a detection unit that detects the measurement reference position based on image data of the image captured by the capturing unit; a reference coordinate creating unit that creates a reference coordinate system based on the measurement reference position detected by the detection unit; a specifying unit that specifies a predetermined measurement position of the measurement object in the reference coordinate system created by the reference coordinate creating unit; and a measuring unit that measures at least one of surface roughness and surface shape of the predetermined measurement position of the measurement object specified by the specifying unit.

7 Claims, 10 Drawing Sheets

(58) Field of Classification Search
USPC .......................................................... 348/79
See application file for complete search history.

(56) References Cited

U.S. PATENT DOCUMENTS

2014/0209818 A1* 7/2014 Oishi .................. G03F 7/70466
250/492.22
2015/0055139 A1 2/2015 Sykora et al.

FOREIGN PATENT DOCUMENTS

| JP | H05-264250 A | 10/1993 |
| JP | H08-313217 A | 11/1996 |
| JP | H08-313248 A | 11/1996 |
| JP | 2003-202208 A | 7/2003 |
| JP | 2014-168031 A | 9/2014 |
| JP | 2015-105931 A | 6/2015 |

OTHER PUBLICATIONS

Notification of Reasons for Refusal dated Jan. 5, 2016 in connection with Japanese Patent Application No. 2015-164374, 7 pgs.

* cited by examiner

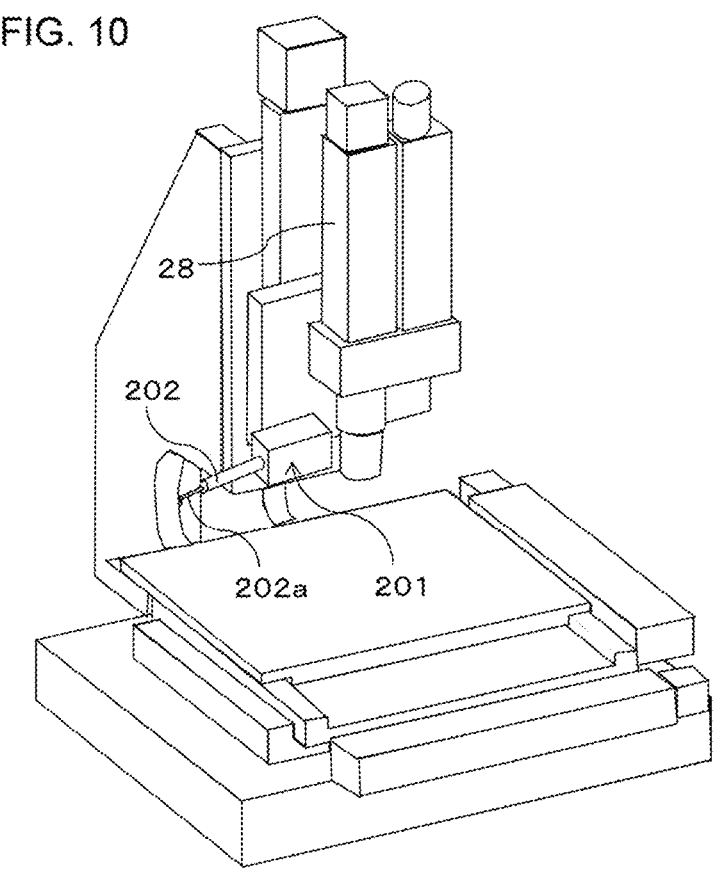

MEASURING DEVICE WITH ALIGNMENT AND REFERENCE POSITION FOR MEASUREMENT OBJECT

CROSS-REFERENCE TO RELATED APPLICATIONS

The following disclosure of the priority application is incorporated by reference in the present specification: Japanese Patent Application No. 2015-164374 filed on Aug. 24, 2015.

TECHNICAL FIELD

The present invention relates to a measuring device that measures surface roughness or surface shape of a wearing component such as a crankshaft, a component having a fine surface shape such as a printed board, or the like.

BACKGROUND

When a precision machining component subjected to grinding, polishing, or the like, or a component subjected to surface treatment by coating, etc. is tested, surface roughness of the component is an important test item. Conventionally, as for a measuring device that measures surface roughness of a component, for example, a measuring instrument of a sensing pin system has been known for measuring surface roughness by making a tip of a sensing pin contact with a measurement object (see Patent Literature 1).

CITATION LIST

Patent Literature

Patent Literature 1: Japanese Unexamined Patent Application Publication No. H8-313248

SUMMARY OF INVENTION

Technical Problem

However, in the above measuring instrument of a sensing pin system, accurate measurement of a measurement position of the measurement object is unfortunately difficult because the measurement position needs to be determined by visual inspection.

For example, when wear resistance of a component having a sliding surface such as a crankshaft is tested, roughness of the same point needs to be repeatedly measured. However, the measurement position is determined by visual inspection, causing an error in the measurement position. This makes it difficult to measure roughness of the same point.

Furthermore, when measuring the surface shape of a pattern of a printed board, the tip of the sensing pin needs to be made to contact with a land portion structuring a concave portion of the pattern to measure the surface shape. However, the pattern printed on the printed board is miniaturized recently, making it difficult to match the position of the tip of the sensing pin with the land portion by visual inspection.

An object of the invention is to provide a measuring device capable of accurately measuring a measurement position of a measurement object.

Solution to Problem

A measuring device according to the invention includes: a placement unit that places thereon a measurement object; an alignment microscope that observes an area including a measurement reference position of the measurement object placed on the placement unit; an capturing unit that captures an image of the area including the measurement reference position observed by the alignment microscope; a detection unit that detects the measurement reference position based on image data of the image captured by the capturing unit; a reference coordinate creating unit that creates a reference coordinate system based on the measurement reference position detected by the detection unit; a specifying unit that specifies a predetermined measurement position of the measurement object in the reference coordinate system created by the reference coordinate creating unit; a measuring unit that measures at least one of surface roughness and surface shape of the predetermined measurement position of the measurement object specified by the specifying unit; a storage unit that stores the measurement reference position, the reference coordinate system, and the predetermined measurement position of the measurement object in the reference coordinate system; and a reference coordinate system setting unit that, when the measurement object is placed on the placement unit again, detects the measurement reference position stored in the storage unit based on image data of an image captured by the capturing unit of the alignment microscope, and sets the reference coordinate system stored in the storage unit by using the measurement reference position, wherein the measuring unit measures again at least one of surface roughness and surface shape of the predetermined measurement position of the measurement object in the reference coordinate system stored in the storage unit.

Furthermore, the measuring device according to the invention includes a movement unit that moves the measuring unit so as to be located just above positional coordinates of the predetermined measurement position in a machine coordinate system corresponding to the predetermined measurement position of the measurement object in the reference coordinate system, wherein the measuring unit measures at least one of surface roughness and surface shape of the predetermined measurement position of the measurement object in the machine coordinate system.

Furthermore, in the measuring device according to the invention, the specifying unit includes a numerical value input unit that inputs numerical values of positional coordinates of the predetermined measurement position in the reference coordinate system.

Furthermore, in the measuring device according to the invention, the reference coordinate creating unit creates the reference coordinate system in which a plurality of the measurement reference positions are references.

Furthermore, in the measuring device according to the invention, the measuring unit measures at least one of surface roughness and surface shape by any of a white color interference microscope system, a confocal microscope system, Furthermore, the measuring device according to the invention includes: a lens tube having an upper portion at which the capturing unit is disposed and a lower portion at which the alignment microscope or the measuring unit is disposed; and a switching mechanism that switches positions of the alignment microscope and the measuring unit so that any of the alignment microscope and the measuring unit is disposed at the lower portion of the lens tube.

Furthermore, the measuring device according to the invention includes: a first lens tube having an upper portion at which a first capturing unit is disposed and a lower portion at which the alignment microscope is disposed; and a second lens tube having an upper portion at which a second capturing unit is disposed and a lower portion at which the measuring unit is disposed.

Advantageous Effects of Invention

According to the measuring device of the invention, surface roughness or surface shape of a measurement object can be measured at an accurate measurement position.

BRIEF DESCRIPTION OF DRAWINGS

FIG. 10 is a perspective view illustrating a measuring instrument according to another embodiment.

DESCRIPTION OF EMBODIMENTS

Figure 1:
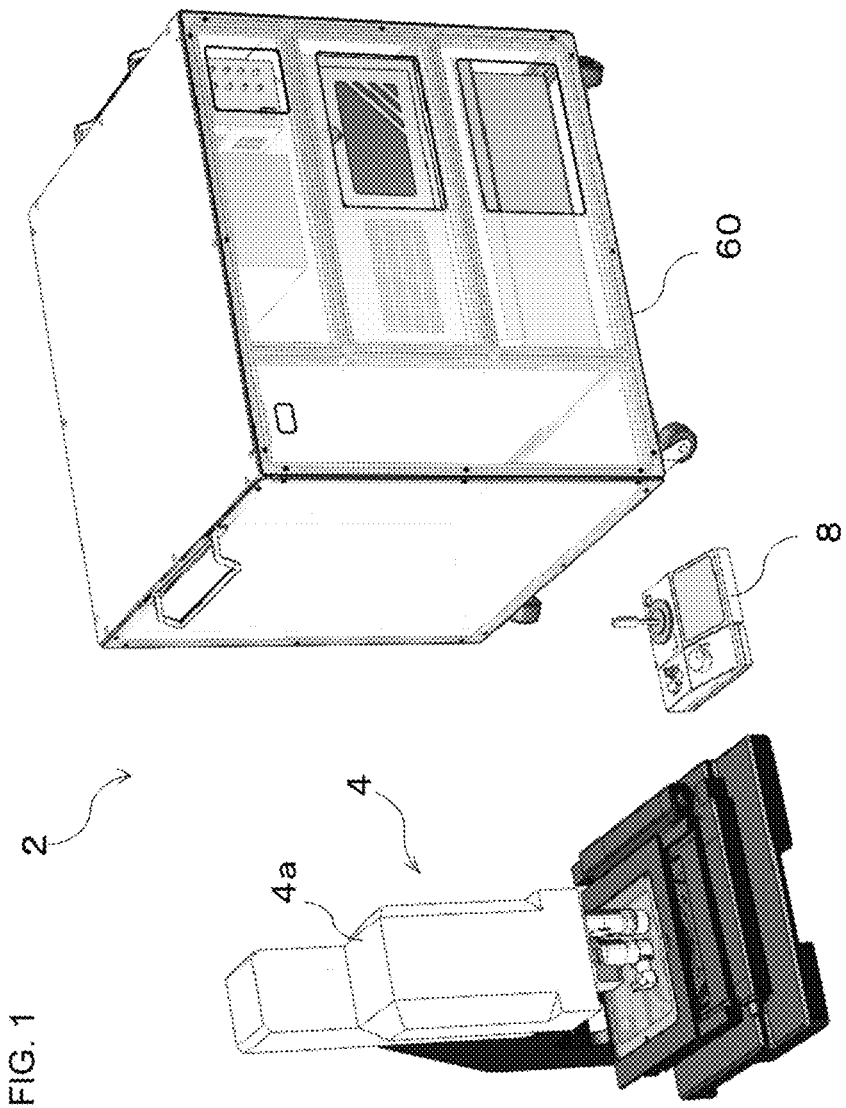
FIG. 1 is a perspective view of a system configuring a measuring device according an embodiment.

Hereinafter, a measuring device according to an embodiment will be described with reference to the drawings by an example of the measuring device that measures surface roughness or surface shape of a wearing component such as a crankshaft, a component having a fine surface shape such as a printed board, etc. FIG. 1 is a perspective view of a system configuring the measuring device according to the embodiment. As shown in FIG. 1, the measuring device 2 is configured by a measuring instrument 4, a control box 60 incorporating a controller 6 (see FIG. 3) that controls each unit of the measuring instrument 4, and an operation unit 8 that operates the measuring instrument 4. Herein, the controller 6 and the measuring instrument 4, and the controller 6 and the operation unit 8 are connected to each other via a wire or wirelessly.

Figure 2:
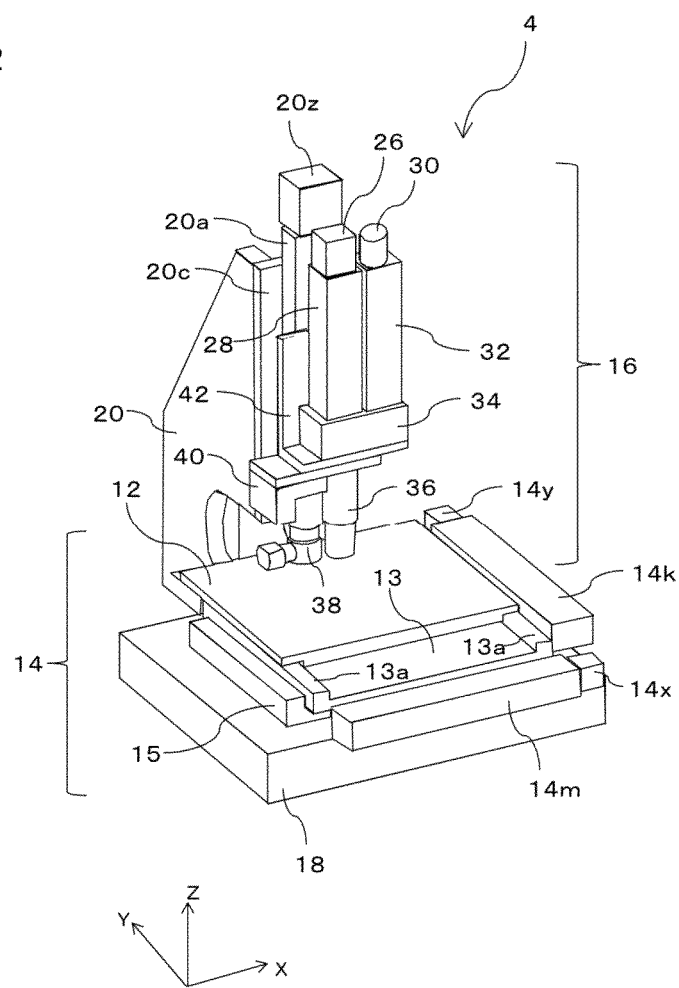
FIG. 2 is a perspective view of a measuring instrument according to the embodiment.

FIG. 2 is a perspective view of the measuring instrument 4 according to the embodiment. FIG. 2 illustrates the measuring instrument 4 whose cover 4a illustrated in FIG. 1 is uncovered. Note that, in the following description, an XYZ orthogonal coordinate system is set and description will be made with reference to the XYZ orthogonal coordinate system. As illustrated in FIG. 2, in the XYZ orthogonal coordinate system, an XY plane is set in parallel with a horizontal plane for placing the measuring instrument 4, and Z axis is set in the upper vertical direction.

As shown in FIG. 2, the measuring instrument 4 includes a moving mechanism 14 for moving a measurement object in the XY plane, a measuring mechanism 16 that measures the measurement object, a seat 18, and a support pillar 20 that supports the moving mechanism 14 and the measuring mechanism 16 so as to be located at respective predetermined positions on the seat 18. Herein, a base plate 20c having a rectangular shape is attached to the support pillar 20, and a guide rail 20a in which a ball screw not shown that moves a slider 42 in Z axis direction is housed is fixed to the base plate 20c. Note that the ball screw is driven by a stepping motor 20z provided at the upper end of the guide rail 20a.

The moving mechanism 14 includes a table 12 having a flat plate rectangular shape for placing thereon a measurement object, a housing unit 14k in which a ball screw not shown that moves the table 12 in Y axis direction is housed, and a stepping motor 14y that drives the ball screw. Furthermore, the moving mechanism 14 includes a slider 13 that supports the table 12, a housing unit 14m in which a ball screw not shown that moves the slider 13 in X axis direction is housed, and a stepping motor 14x that drives the ball screw. Furthermore, the moving mechanism 14 includes a supporting unit located below the slider 13 to support the slider 13.

Herein, cross roller guides 13a for moving the table 12 in Y axis direction is formed on the surface of the slider 13, and a cross roller guide not shown for moving the table 12 in X axis direction is formed on the back surface of the slider 13.

The measuring mechanism 16 includes a first lens tube 28 having an upper end at which a camera 26 is attached, a second lens tube 32 having an upper end at which an illumination 30 is attached, an optical path box 34, an alignment objective lens 36, a white color interference objective lens 38, and the slider 42 that supports the first lens tube 28 and the second lens tube 32 and moves in Z axis direction along the guide rail 20a.

Herein, the alignment objective lens 36 is an objective lens for observing an alignment position to be a measurement reference position of a measurement object, and the white color interference objective lens 38 is an objective lens for observing surface roughness or surface shape of a measurement position. Note that the alignment objective lens 36 and the white color interference objective lens 38 are arranged so as to be able to be slid in X axis direction, making it possible to switch any one of the alignment objective lens 36 and the white color interference objective lens 38 to be located at the position just below the first lens tube 28. Furthermore, a mirror and a beam splitter not shown are arranged in the optical path box 34.

Figure 3:
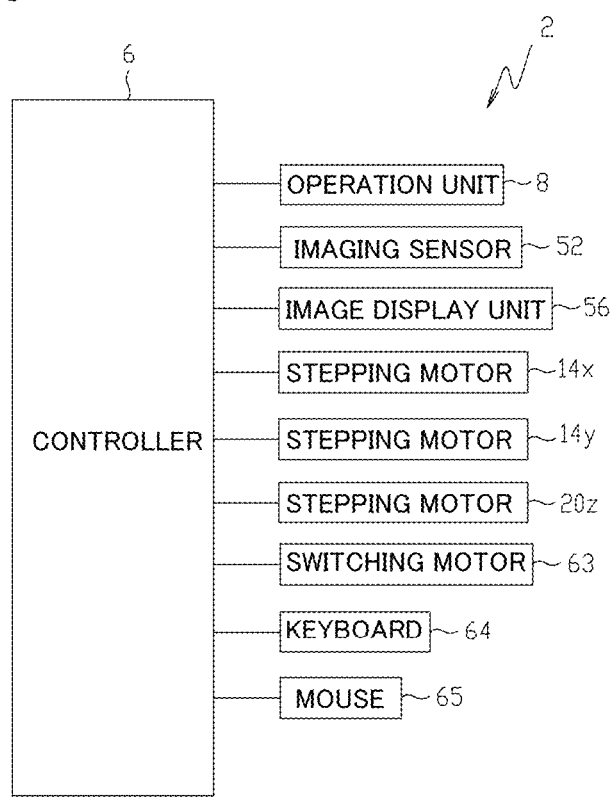
FIG. 3 is a block configuration diagram of the measuring device according to the embodiment.

FIG. 3 is a block configuration diagram of the measuring device 2 according to the embodiment. The measuring device 2 includes the controller 6, and to the controller 6, the operation unit 8 for moving the table 12 in XYZ axes directions by manual, an imaging sensor 52 that is arranged in the camera 26 and captures subject light to generate an imaging signal, an image display unit 56 that displays an image based on image data, the stepping motors 14x, 14y, and 20z, a switching motor 63 that switches the positions of the alignment objective lens 36 and the white color interference objective lens 38, a keyboard 64, and a mouse 65 are connected.

Figure 4:
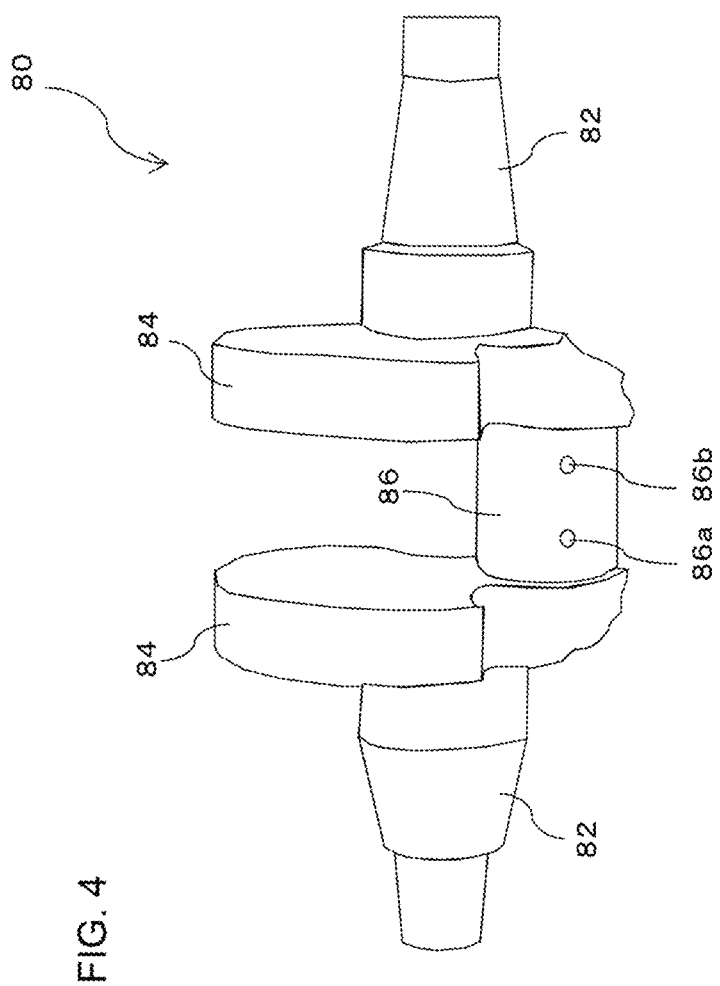
FIG. 4 is a diagram illustrating a crankshaft that is a measurement object according to the embodiment.

FIG. 4 is a diagram illustrating a crankshaft 80 that is a measurement object. The crankshaft 80 includes main journals 82 that are rotational axes of the crankshaft 80, crank webs 84, and a crankpin 86 that connects the main journals 82 to each other via the crank webs 84. Note that a first oil hole 86*a* and a second oil hole 86*b* that are inlets of an oil path not shown formed in the crankpin 86 are provided in the crankpin 86.

Figure 5:
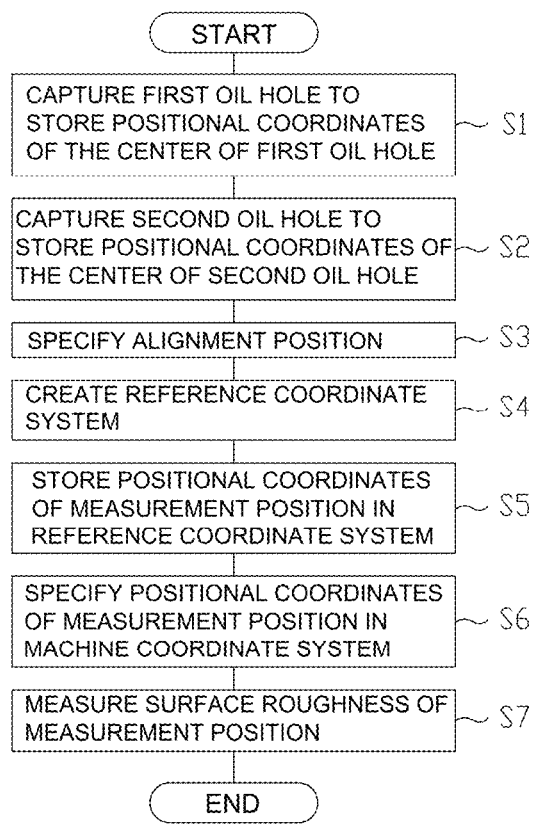
FIG. 5 is a flowchart illustrating a processing in a case of measuring a crankshaft that is a measurement object at a first time using the measuring device according to the embodiment.

Next, the processing in the case of measuring the crankshaft 80 at a first time (teaching work) using the measuring device 2 according to the embodiment will be described with reference to the flowchart illustrated in FIG. 5. Note that the flowchart illustrated in FIG. 5 mainly describes the processing by the controller 6.

In the teaching work, first, a worker puts the crankshaft 80 on the table 12 such that the crankpin 86 is located below the alignment objective lens 36, and the first oil hole 86*a* and the second oil hole 86*b* are oriented in the upper direction.

Figure 6:
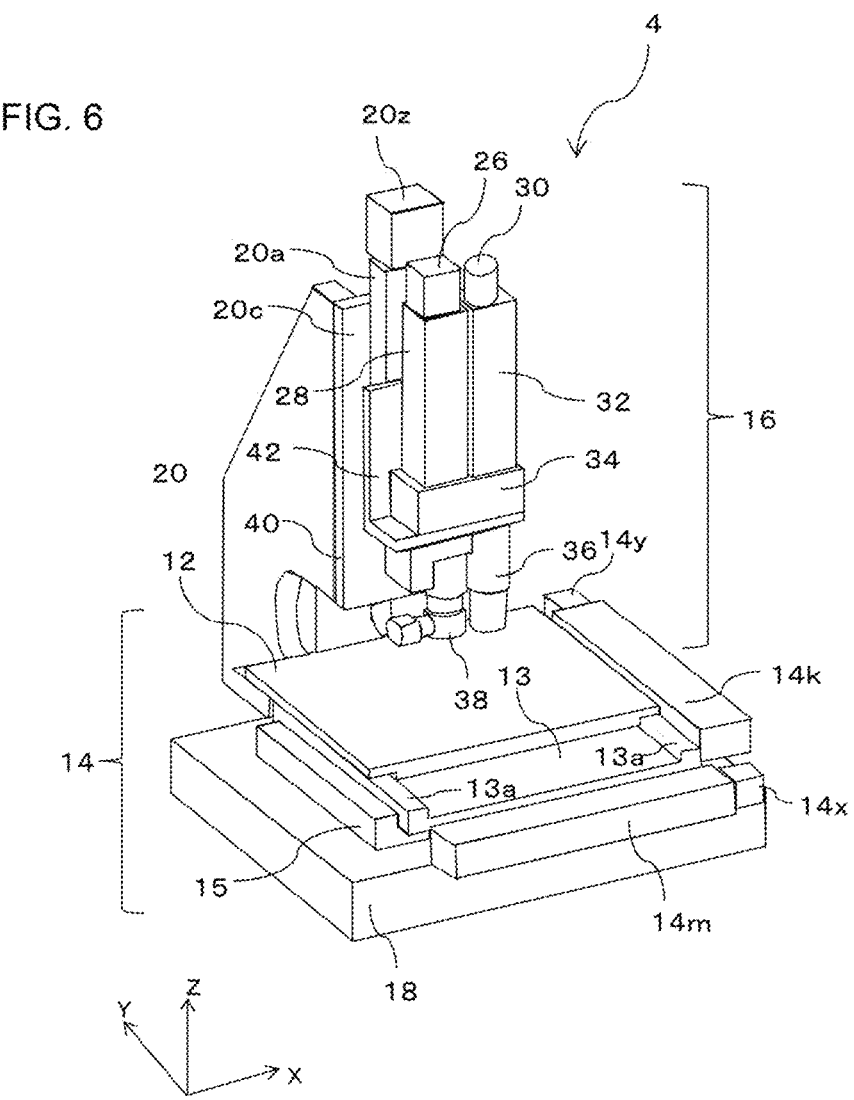
FIG. 6 is a perspective view illustrating a state of the measuring instrument during measurement according to the embodiment.

Next, the worker operates one of the button displayed on the image display unit 56, the keyboard 64, and the mouse 65 to move the white color interference objective lens 38 and the alignment objective lens 36 in −X direction, and switches from the white color interference objective lens 38 located just below the first lens tube 28 at first as illustrated in FIG. 6 to the alignment objective lens 36 as illustrated in FIG. 2. Herein, when the illumination 30 is turned on and illumination light is emitted from the illumination 30, the emitted illumination light is passed inside the second lens tube 32, and then, is reflected by the mirror and the beam splitter in the optical path box 34, is passed through the alignment objective lens 36, and illuminates the surface of the crankpin 86.

The reflection light reflected on the surface of the crankpin 86 is incident on the alignment objective lens 36 and thereafter is passed inside the first lens tube 28, and is formed image on an imaging surface of the imaging sensor 52 in the camera 26. Thus, the image of the surface of the crankpin 86 imaged on the imaging surface of the imaging sensor 52 is captured to be displayed on the image display unit 56.

Next, the worker operates the operation unit 8 while looking the image display unit 56, and finely adjusts the position of the table 12 in XY axes directions and the position of the alignment objective lens 36 in Z axis direction so that an area including the first oil hole 86*a* and the second oil hole 86*b* can be accurately imaged. Herein, the position of the table 12 in Y axis direction is adjusted by driving the ball screw housed in the housing unit 14*k* by the stepping motor 14*y*. On the other hand, the position of the table 12 in X axis direction is adjusted by driving the ball screw housed in the housing unit 14*m* by the stepping motor 14*x* to move the slider 13 in X axis direction. Furthermore, the position of the alignment objective lens 36 in Z axis direction is adjusted by driving the ball screw housed in the guide rail 20*a* by the stepping motor 20*z* to move the slider 42 in Z axis direction.

Next, when the worker operates any of the button displayed on the image display unit 56, the keyboard 64, and the mouse 65 for capturing instruction, the controller 6 makes the imaging sensor 52 capture the first oil hole 86*a*, and stores positional coordinates of the center of the first oil hole 86*a* by image processing (step S1). Next, the controller 6 makes the imaging sensor 52 capture the second oil hole 86*b*, and stores positional coordinates of the center of the second oil hole 86*b* by image processing (step S2). Next, the controller 6 specifies the positional coordinates of the center of the first oil hole 86*a* in a coordinate system in the image as a first alignment position, and specifies the positional coordinates of the center of the second oil hole 86*b* in the coordinate system in the image as a second alignment position for storing (step S3).

Next, the controller 6 creates a reference coordinate system in which the first alignment position is the origin, the line connecting the first alignment position and the second alignment position is X coordinate axis, and the coordinate axis perpendicular to X coordinate axis at the first alignment position is Y coordinate axis (step S4). The controller 6 stores the created reference coordinate system. Note that the positional coordinates of the first alignment position in the reference coordinate system and the positional coordinates of the second alignment position in the reference coordinate system can be displayed on the reference coordinate system displayed on the image display unit 56 as numerical values. Consequently, the worker can confirm the positional coordinates of the first alignment position in the reference coordinate system and the positional coordinates of the second alignment position in the reference coordinate system on the image display unit 56.

Next, the worker operates any of the buttons displayed on the image display unit 56, the keyboard 64, and the mouse 65 to input positional coordinates of the measurement position in the reference coordinate system. For example, the worker inputs the positional coordinates of the midpoint of the first alignment position in the reference coordinate system and the second alignment position in the reference coordinate system as the positional coordinates of the measurement position in the reference coordinate system. The controller 6 stores the input positional coordinates of the measurement position in the reference coordinate system (step S5).

Next, the controller 6 detects the positional coordinates of the camera 26 in a machine coordinate system which is a coordinate system in which the origin of the measuring instrument 4 that is preliminarily stored is its reference to specify the positional coordinates of the camera 26 in the reference coordinate system. Next, the controller 6 makes the reference coordinate system correspond to the machine coordinate system by using the positional coordinates of the camera 26 in the machine coordinate system and the positional coordinates of the camera 26 in the reference coordinate system to specify the positional coordinates of the measurement position in the machine coordinate system (step S6).

Next, the worker operates any of the buttons displayed on the image display unit 56, the keyboard 64, and the mouse 65 to switch the objective lens located just below the first lens tube 28 from the alignment objective lens 36 to the white color interference objective lens 38. The controller 6 adjusts the position of the table 12 in XY directions so that the white color interference objective lens 38 is located just above the positional coordinates of the measurement position in the machine coordinate system.

Next, the controller 6 continuously captures images of the measurement position while moving the white color interference objective lens 38 in a stepping manner in the upper direction or the lower direction at a predetermined pitch, and measures the surface roughness of the measurement position using the image data of the plurality of captured images (step S7). Herein, the surface roughness is measured, for example, as described below. That is, first, to each of the captured image data, an envelope curve of brightness value is obtained for each pixel on the basis of the brightness value of each pixel constituting the image data, Z position at which the value of the envelope curve is maximum is calculated, and a relative high of each pixel is determined. Next, a roughness parameter of the position corresponding to the measurement position is calculated using a calculating formula that meets ISO standard or JIS standard.

Figure 7:
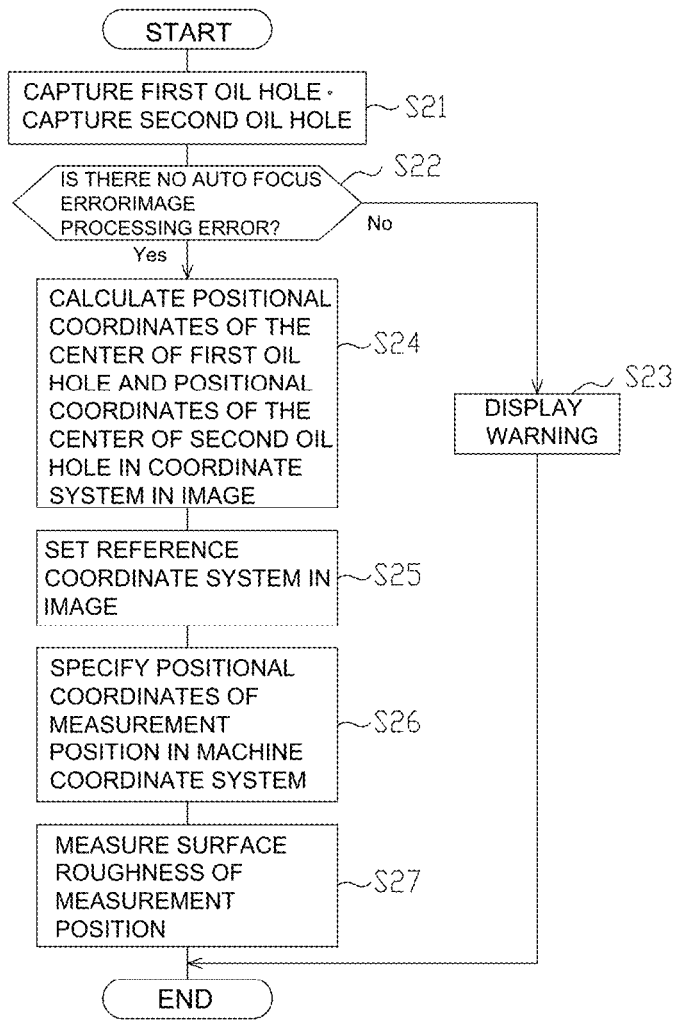
FIG. 7 is a flowchart illustrating a processing in a case of measuring the crankshaft at a second or subsequent time using the measuring device according to the embodiment.

Next, a second or subsequent measurement processing of the crankshaft 80 will be described with reference to the flowchart illustrated in FIG. 7. The worker first places the crankshaft 80 on the table 12, and performs instruction for remeasurement by using the button displayed on the image display unit 56, the keyboard 64, or the mouse 65. When remeasurement is instructed, the controller 6 first switches the objective lens located just below the first lens tube 28 from the white color interference objective lens 38 to the alignment objective lens 36 by driving the switching motor 63. Next, the controller 6 turns on the illumination 30 to emits illumination light from the illumination 30 to illuminate the area just below the alignment objective lens 36, makes the imaging sensor 52 capture the first oil hole 86a via the alignment objective lens 36, and makes the imaging sensor 52 capture the position of the second oil hole 86b via the alignment objective lens 36 (step S21).

Then, the controller 6 confirms that no error occurs in auto focus and image processing during capturing the first oil hole 86a and the second oil hole 86b, and determines acceptance or rejection of the alignment (step S22).

When auto focus error or image processing error occurs (step S22: No), the controller 6 makes the image display unit 56 display a warning such as "Is remeasurement manually performed?" (step S23). On the other hand, when determining that no error is occurred and capturing is succeeded in step S22 (step S22: Yes), the controller 6 calculates the positional coordinates of the center of the first oil hole 86a in the coordinate system in the image and the positional coordinates of the center of the second oil hole 86b in the coordinate system in the image by subjecting the image data of the captured image to a predetermined image processing (step S24).

Next, the controller 6 sets the position of the reference coordinate system in the captured image by using the positional coordinates of the center of the first oil hole 86a and the positional coordinates of the center of the second oil hole 86b (step S25). Next, the controller 6 detects the positional coordinates of the camera 26 in the machine coordinate system and specifies the positional coordinates of the camera 26 in the reference coordinate system. Next, the controller 6 specifies the positional coordinates of the measurement position in the machine coordinate system by using the stored positional coordinates of the measurement position in the reference coordinate system and the positional coordinates of the camera 26 in the reference coordinate system (step S26).

Next, the controller 6 switches the objective lens located just below the first lens tube 28 from the alignment objective lens 36 to the white color interference objective lens 38 by driving the switching motor 63, and further adjusts the position of the table 12 in XY directions so that the positional coordinates of the measurement position in the machine coordinate system is located just below the white color interference objective lens 38.

Next, the controller 6 continuously captures images of the measurement position while moving the white color interference objective lens 38 in a stepping manner in the upper direction or the lower direction at a predetermined pitch, and measures the surface roughness of the measurement position using the image data of the plurality of captured images (step S27).

According to the measuring device relating to the embodiment, surface roughness or surface shape can be measured at the accurate measurement position by creating a reference coordinate system in which an alignment position is a reference, and by performing measurement at the measurement position using the reference coordinate system. Particularly, when a wearing component such as the crankshaft 80 is a measurement object, the same measurement position can be measured repeatedly, making it possible to accurately evaluate the wear resistance. Furthermore, the reference coordinate system in which a plurality alignment positions are references is created, so that the position of the measurement object is prevented from being rotated in XY plane, making it possible to accurately measure measurement position. Note that the measuring device according to the embodiment is capable of accurately measuring measurement position also in the case of measuring the same measurement position of a plurality of measurement objects.

Alternatively, in the above embodiment, the reference coordinate system is created by using a plurality of alignment positions as references, but the reference coordinate system may be created by using one alignment position as a reference. For example, when a rectangular component such as a printed board is a measurement object, the printed board is placed on a predetermined position of the table 12 by using an abutting jig or the like such that the position of the printed board is prevented from being rotated in XY plane. In this case, the worker finely adjusts the position of the table 12 in XY axes directions and the position of the alignment objective lens 36 in Z axis direction to capture an image in an area including a corner of the printed board on the table 12, and stores the image data of the captured image. The controller 6 calculates the positional coordinates of the corner of the printed board in the coordinate system in the stored image, and specifies the positional coordinates of the corner of the printed board in the coordinate system in the image as the alignment position. Next, the controller 6 creates a reference coordinate system in which the alignment position is the origin, X coordinate axis in the coordinate system in the image is X coordinate axis, and Y coordinate axis in the coordinate system in the image is Y coordinate axis.

In the above embodiment, although the example is described in which surface roughness of the measurement position is measured, surface shape of the measurement position may be measured. For example, when a component having a fine surface shape such as a printed board is a measurement object, the worker makes the imaging sensor 52 capture an image of an area including a part of a pattern formed on a surface of the printed board. Next, when the controller 6 creates a reference coordinate system using the image data of the captured image, the worker inputs positional coordinates on a land portion structuring a convex portion of the pattern in the reference coordinate system as the positional coordinates of the measurement position. The controller 6 calculates the positional coordinates of the measurement position in the machine coordinate system, locates the position of the positional coordinates of the measurement position in the machine coordinate system just below the white color interference objective lens 38, and measures the surface shape of the land portion. Note that, for example, the surface shape to be measured includes the high and width of the land portion.

Figure 8:
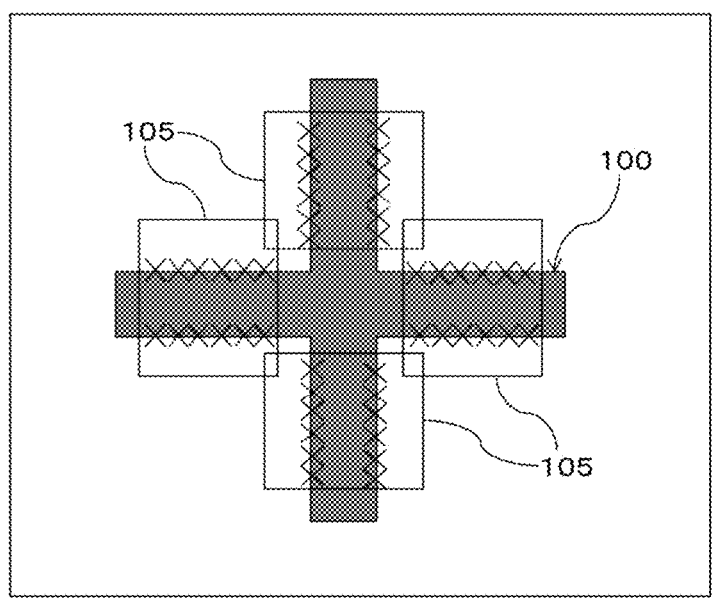
FIG. 8 is a diagram illustrating an alignment mark printed on a measurement object to be measured in another embodiment.

Furthermore, in the above embodiment, when surface roughness or surface shape of the printed board is measured, for example, an alignment mark that becomes a mark when specifying alignment position may be preliminarily printed on a surface of the component. In this case, the controller 6 first makes the imaging sensor 52 capture an image of an area including the alignment mark, and calculates the positional coordinates of the center position of the alignment mark in the coordinate system in the image by using the image data of the captured image. For example, when the alignment mark 100 has the cross shape as illustrated in FIG. 8, the controller 6 detects the outlines of the alignment mark 100 included in four areas 105 forming the cross shape of the alignment mark 100. Next, the controller 6 calculates the positional coordinates of the outlines in the coordinate system in the image, and specifies the positional coordinates of the center of the cross shape in the coordinate system in the image using the calculated positional coordinates of the outlines. Next, the controller 6 creates a reference coordinate system in which the positional coordinates of the center of the cross shape of the alignment mark 100 in the coordinate system in the image is a reference. Next, when the worker inputs the positional coordinates of the measurement position in the reference coordinate system, the controller 6 converts the positional coordinates of the measurement position in the reference coordinate system into the positional coordinates of the measurement position in the machine coordinate system, adjusts the position of the table 12 in XY directions so that the positional coordinates of the measurement position in the machine coordinate system is located just below the white color interference objective lens 38, and measures surface roughness of the measurement position.

Figure 9:
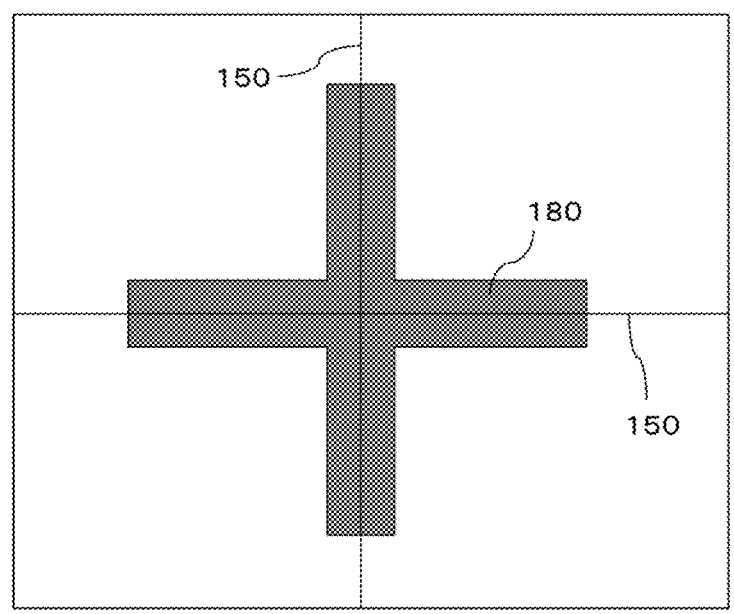
FIG. 9 is a diagram illustrating an alignment mark printed on a measurement object to be measured in another embodiment.

Alternatively, the worker may determine the center of the alignment mark by visual inspection. In this case, for example, when observing the alignment mark, the worker makes grid lines 150 (see FIG. 9) be displayed on the image display unit 56. Next, the worker finely adjusts the position of the table 12 in XY directions by operating the operation unit 8 to match the position of the intersection point of the grid lines 150 with the position of the center of the alignment mark 180 as illustrated in FIG. 9, and creates a reference coordinate system in which the positional coordinates of the center position of the alignment mark 180 is a reference. Next, when the worker inputs a measurement position in the reference coordinate system, the controller 6 converts the positional coordinates of the measurement position in the reference coordinate into the positional coordinates of the measurement position in the machine coordinate system, adjusts the position of the table 12 in XY directions so that the positional coordinates of the measurement position in the machine coordinate system is located just below the white color interference objective lens 38, and measures surface roughness of the measurement position.

In the above embodiment, a case is described as an example in which measurement position is measured by using the white color interference objective lens 38, but measurement position may be measured by using a microscope capable of measuring three dimensional surface shape by a confocal microscope system instead of the white color interference objective lens 38. Alternatively, instead of objective lens, a measuring unit 201 of a sensing pin system may be equipped at a lower end of the first lens tube 28 as illustrated in FIG. 10. The measuring device 2 of the embodiment specifies the measurement position by using the reference coordinate system in which an alignment position is a reference so as to be able to specify the measurement position without visual inspection, so that even when the measuring unit 201 of a sensing pin system is equipped therein, a tip 202a of a sensing pin 202 can be accurately made to contact with the measurement position to measure surface roughness or surface shape of the measurement objet.

Alternatively, in the above embodiment, the measuring device 2 may have no switching motor 63. For example, the measuring instrument 4 may separately have an alignment microscope for detecting alignment position and a measurement microscope for measurement. Herein, the alignment microscope to be used is the one in which a camera is attached at an upper end of a lens tube, and the alignment objective lens 36 is attached at a lower end of the lens tube. Furthermore, the measurement microscope to be used is the one in which a camera is attached at an upper end of the lens tube, and the white color interference objective lens 38 is attached at the lower end of the lens tube.

Furthermore, in the above embodiment, surface roughness may be measured at a plurality of measurement positions. In this case, the worker inputs, for example, a plurality of positional coordinates of the measurement positions in the reference coordinate system from an input unit. Next, the controller 6 converts the positional coordinates of each of the measurement positions in the reference coordinate system into the positional coordinates of the measurement position in the machine coordinate system. Herein, when the objective lens located just below the first lens tube 28 is switched to the white color interference objective lens 38, the controller 6 moves the table 12 to sequentially make the positional coordinates of each of the measurement positions in the machine coordinate system be located just below the white color interference objective lens 38, and measures surface roughness of each of the measurement positions. This makes it possible to accurately measure a plurality of measurement positions repeatedly.

Furthermore, in the above embodiment, an example is described in which the table 12 is moved to locate the position of the measurement position in XY plane just below the white color interference objective lens 38, the position of the measuring mechanism 16 in XY directions may be adjusted without moving the table 12. For example, when a measurement position is measured, the position of the measuring mechanism 16 is moved in XY plane to locate the white color interference objective lens 38 just above the measurement position in the machine coordinate system.

The embodiment described above is described to make the invention be easily understood, and is not described to limit the invention. Therefore, each element disclosed in the above embodiment is intended to include any modification in design and equivalent belonging to the technical scope of the invention.

The invention claimed is:

1. A measuring device comprising:
   a placement unit that places thereon a measurement object, wherein the measurement object is a component, wherein a surface condition of the measurement object is changed by sliding or processing, wherein a change in the surface condition is to be inspected;
   an alignment microscope that observes an area including a measurement reference position of the measurement object placed on the placement unit;
   an capturing unit that captures an image of the area including the measurement reference position observed by the alignment microscope;
   a detection unit that detects the measurement reference position based on image data of the image captured by the capturing unit;
   a reference coordinate creating unit that creates a reference coordinate system based on the measurement reference position detected by the detection unit;
   a specifying unit that specifies a predetermined measurement position of the measurement object in the reference coordinate system created by the reference coordinate creating unit;

a measuring unit that measures at least one of surface roughness and surface shape of the predetermined measurement position of the measurement object specified by the specifying unit;

a storage unit that stores the measurement reference position, the reference coordinate system, and the predetermined measurement position of the measurement object in the reference coordinate system; and a reference coordinate system setting unit that, when the measurement object is placed on the placement unit again, detects the measurement reference position stored in the storage unit based on image data of an image captured by the capturing unit of the alignment microscope, and sets the reference coordinate system stored in the storage unit by using the measurement reference position, wherein the measuring unit measures again at least one of surface roughness and surface shape of the predetermined measurement position of the measurement object in the reference coordinate system stored in the storage unit.

2. The measuring device according to claim 1 comprising a movement unit that moves the measuring unit so as to be located just above positional coordinates of the predetermined measurement position in a machine coordinate system corresponding to the predetermined measurement position of the measurement object in the reference coordinate system, wherein the measuring unit measures at least one of surface roughness and surface shape of the predetermined measurement position of the measurement object in the machine coordinate system.

3. The measuring device according to claim 1, wherein the specifying unit includes a numerical value input unit that inputs numerical values of positional coordinates of the predetermined measurement position in the reference coordinate system.

4. The measuring device according to claim 1, wherein the reference coordinate creating unit creates the reference coordinate system in which a plurality of the measurement reference positions are references.

5. The measuring device according to claim 1, wherein the measuring unit measures at least one of surface roughness and surface shape by any of a white color interference microscope system, a confocal microscope system, and a sensing pin system.

6. The measuring device according to claim 1 comprising:
a lens tube having an upper portion at which the capturing unit is disposed and a lower portion at which the alignment microscope or the measuring unit is disposed; and
a switching mechanism that switches positions of the alignment microscope and the measuring unit so that any of the alignment microscope and the measuring unit is disposed at the lower portion of the lens tube.

7. The measuring device according to claim 1 comprising:
a first lens tube having an upper portion at which a first capturing unit is disposed and a lower portion at which the alignment microscope is disposed; and
a second lens tube having an upper portion at which a second capturing unit is disposed and a lower portion at which the measuring unit is disposed.

* * * * *